United States Patent
Tseng et al.

(10) Patent No.: US 11,881,737 B2
(45) Date of Patent: Jan. 23, 2024

(54) BATTERY MODULE, CHARGING CONTROL METHOD, AND STORAGE MEDIUM

(71) Applicant: Beijing Xiaomi Mobile Software Co., Ltd., Beijing (CN)

(72) Inventors: Yaoyi Tseng, Beijing (CN); Renjie Chen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 482 days.

(21) Appl. No.: 17/146,959

(22) Filed: Jan. 12, 2021

(65) Prior Publication Data

US 2021/0359535 A1    Nov. 18, 2021

(30) Foreign Application Priority Data

May 14, 2020  (CN) .......................... 202010408781.3

(51) Int. Cl.
  *H02J 7/00*    (2006.01)
(52) U.S. Cl.
  CPC ........ *H02J 7/00718* (2020.01); *H02J 7/0024* (2013.01); *H02J 7/0071* (2020.01)
(58) Field of Classification Search
  USPC ........................................................ 320/117
  See application file for complete search history.

(56) References Cited

U.S. PATENT DOCUMENTS

| 2014/0028244 A1* | 1/2014 | Korekoda | ............... H02J 50/80 320/108 |
| 2016/0099588 A1* | 4/2016 | Bae | ..................... H02J 7/00047 320/117 |
| 2018/0316198 A1* | 11/2018 | Niizuma | ................. B60L 58/12 |

FOREIGN PATENT DOCUMENTS

| CN | 105914823 A | 8/2016 |
| CN | 110829528 A | 2/2020 |
| EP | 3373406 A1 | 9/2018 |
| EP | 3503282 A1 | 6/2019 |
| JP | H 11234909 A | 8/1999 |
| JP | 2008278635 A | 11/2008 |
| JP | 2009071921 A | 4/2009 |
| JP | 2017093091 A | 5/2017 |

(Continued)

OTHER PUBLICATIONS

Examination Report for Indian Application No. 202044056831, dated Jan. 3, 2022.

(Continued)

*Primary Examiner* — Samuel Berhanu
(74) *Attorney, Agent, or Firm* — Finnegan, Henderson, Farabow, Garrett & Dunner, L.L.P

(57) ABSTRACT

A battery module includes: a battery module including a plurality of cells, a series-parallel conversion circuit, and a controller, wherein the controller is coupled to the series-parallel conversion circuit and is configured to control the series-parallel conversion circuit to convert a connection mode of cells in the plurality of cells when the battery module is to be charged, such that the plurality of cells form a charging architecture state with a charging current greater than a preset current value, the charging architecture state including at least one of: at least two cells coupled in series, at least two cells coupled in parallel, a combination of first cells coupled in series and second cells coupled in parallel, or a single cell.

16 Claims, 15 Drawing Sheets

(56) References Cited

FOREIGN PATENT DOCUMENTS

KR    101845793 B1    4/2018

OTHER PUBLICATIONS

Notice of Reasons for Refusal for Japanese Application No. 2020-176765, dated Dec. 14, 2021.
Extended European Search Report in European Application No. 20216988.4, dated Jun. 10, 2021.
Notice of the first review opinion for Chinese Application No. 202010408781.3, dated Sep. 26, 2023.
Report on Demand for Chinese Application No. 2020104087813, dated Sep. 7, 2023, 10 pages.

* cited by examiner

US 11,881,737 B2

BATTERY MODULE, CHARGING CONTROL METHOD, AND STORAGE MEDIUM

CROSS REFERENCE TO RELATED APPLICATION

This application is based on and claims priority to Chinese Patent Application No. 202010408781.3, filed on May 14, 2020, the entire content of which is hereby incorporated by reference.

TECHNICAL FIELD

The present disclosure relates to the field of charging technologies, and more particularly, to a battery module, a charging control method, and a storage medium.

BACKGROUND

Electronic devices in the related art adopt the following charging architecture. As illustrated in FIG. 1, which is a block diagram of an electronic device in the related art, the architecture usually includes a charger 101 and a mobile phone 103. The mobile phone 103 includes a charging conversion device, such as a charging circuit 105 and a charging circuit 106, and a battery module system. In order to prevent the charging current from exceeding a maximum current of the charging cable, in the related art, an output voltage of the charger 101 is generally increased, and a voltage conversion is performed through the charging circuit 105 and the charging circuit 106. Normally, the output voltage of the charging circuit 105 and the charging circuit 106 is half of the output voltage of the charger 101, that is, the battery module is charged with a high voltage and a low current. However, in this charging architecture, the charging conversion device may generate heat loss during a voltage conversion process, which heats up a temperature of the mobile phone, reduces charging efficiency, prolongs charging time, and affects charging experience of users.

SUMMARY

According to a first aspect of embodiments of the present disclosure, a battery module includes a plurality of cells, a series-parallel conversion circuit, and a controller. The controller is coupled to the series-parallel conversion circuit and is configured to control the series-parallel conversion circuit to convert a connection mode of cells in the plurality of cells when the battery module is to be charged, such that the plurality of cells form a charging architecture state with a charging current greater than a preset current value. The charging architecture state includes at least one of: at least two cells coupled in series, at least two cells coupled in parallel, a combination of first cells coupled in series and second cells coupled in parallel, or a single cell.

According to a second aspect of embodiments of the present disclosure, a charging control method for a battery module including a plurality of cells, a series-parallel conversion circuit, and a controller, includes: determining whether the battery module is to be charged; and in response to that the battery module is to be charged, controlling the series-parallel conversion circuit to convert a connection mode of cells in the plurality of cells, such that the plurality of cells form a charging architecture state with a charging current greater than a preset current value. The charging architecture state includes at least one of: at least two cells coupled in series, at least two cells coupled in parallel, a combination of first cells coupled in series and second cells coupled in parallel, or a single cell.

According to a third aspect of embodiments of the present disclosure, a non-transitory computer-readable storage medium has thereon instructions that, when executed by a processor of a device, cause the device to perform a charging control method on a battery module including a plurality of cells, wherein the method includes: determining whether the battery module is to be charged; and in response to that the battery module is to be charged, converting a connection mode of cells in the plurality of cells, such that the plurality of cells form a charging architecture state with a charging current greater than a preset current value, the charging architecture state including at least one of: at least two cells coupled in series, at least two cells coupled in parallel, a combination of first cells coupled in series and second cells coupled in parallel, or a single cell.

It should be understood that the above general description and the following detailed description are only exemplary and explanatory, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Embodiments of the present disclosure provide a battery module. A series-parallel conversion circuit is arranged in the battery module, and the series-parallel conversion circuit is configured to adjust a charging architecture state of a plurality of cells in the battery module, such that a charging current is adjusted to be greater than a preset current value and less than a maximum current of a charging cable. Consequently, an effect of using a high voltage and large current to charge the battery module is achieved, which is beneficial to improving the charging efficiency of the battery module. In addition, the series-parallel conversion circuit according to embodiments of the present disclosure may not participate in voltage conversion or cause heat loss, which is also helpful for improving the charging efficiency of the battery module.

Figure 1:
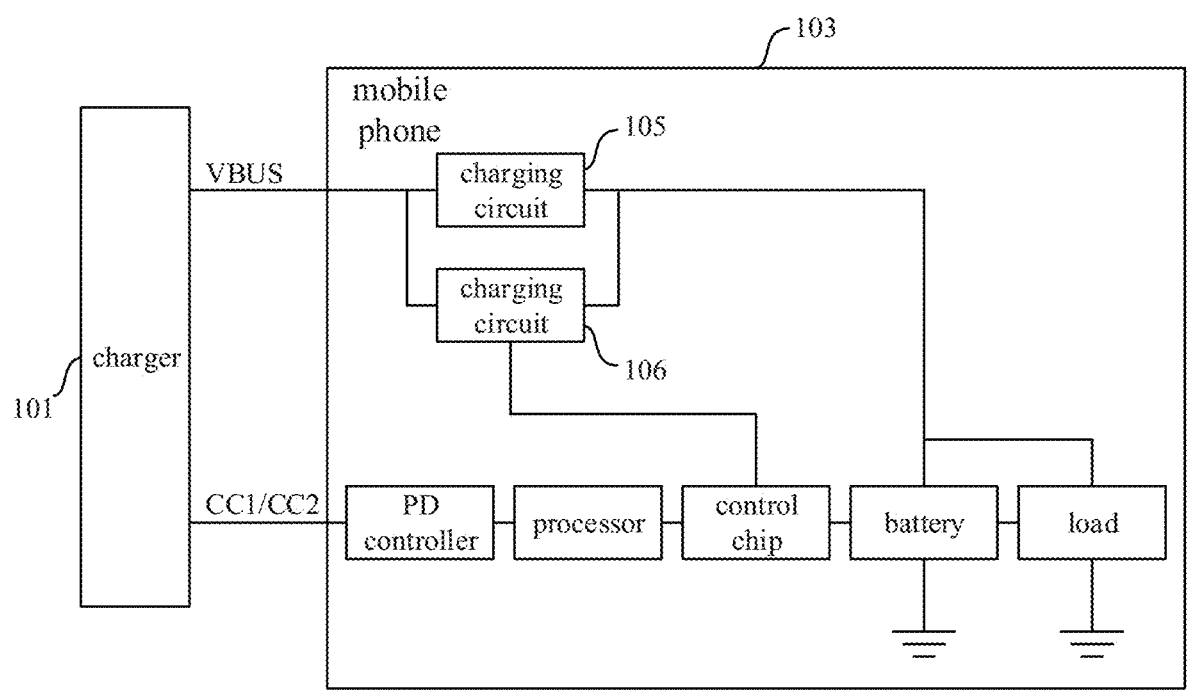
FIG. 1 is a block diagram of an electronic device in related art.
Figure 2:
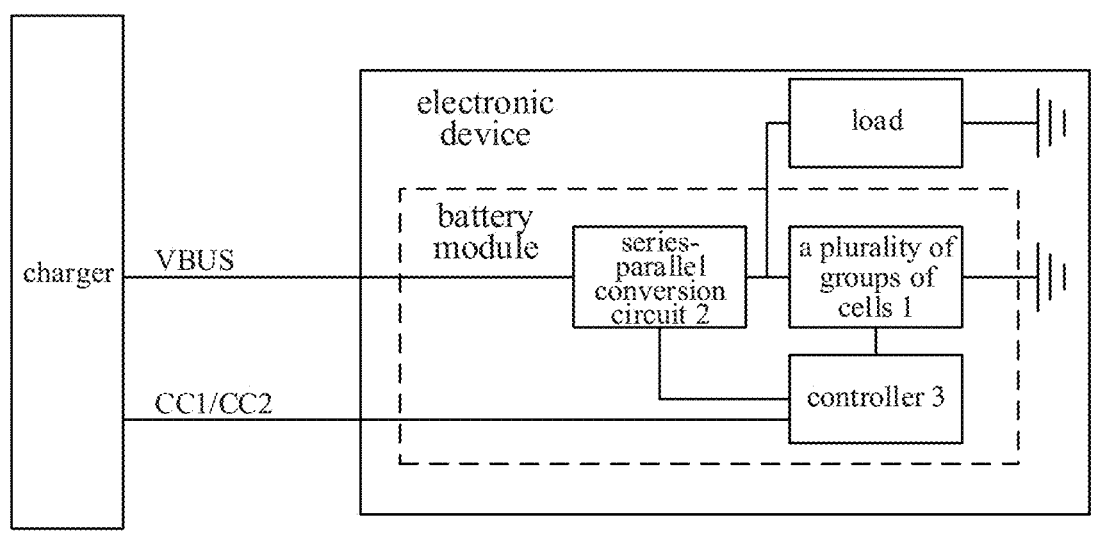
FIG. 2 is a block diagram of a battery module according to an exemplary embodiment.

FIG. 2 is a block diagram of a battery module according to an exemplary embodiment. Referring to FIG. 2, the battery module includes: a plurality of cells 1, a series-parallel conversion circuit 2, and a controller 3. The series-parallel conversion circuit 2 is respectively coupled to the controller 3 and the plurality of cells 1. The controller 3 is configured to control the series-parallel conversion circuit 2 to convert a connection mode of cells in the plurality of cells 1 when the battery module is to be charged, such that the plurality of cells 1 form a charging architecture state with a charging current greater than a preset current value, the charging architecture state including at least one of: at least two cells coupled in series, at least two cells coupled in parallel, a combination of certain cells coupled in series and certain cells coupled in parallel, or a single cell.

In an embodiment, the controller 3 may be arranged inside the battery module, such that the battery module may be produced as an independent product. In an embodiment, the controller 3 may be implemented by a processor or a power management chip of an electronic device where the battery module is in, which is not limited here. The following embodiments of the present disclosure are described by taking an example of arranging the controller 3 inside the battery module. In this case, the battery module may directly communicate with an external charger that charges the battery module and determine whether to charge the battery module, thereby improving the charging efficiency. In addition, dependence of the battery module on the processor or the power management chip of the electronic device may be reduced, and working efficiency of the processor or the power management chip may be improved.

Figure 3:
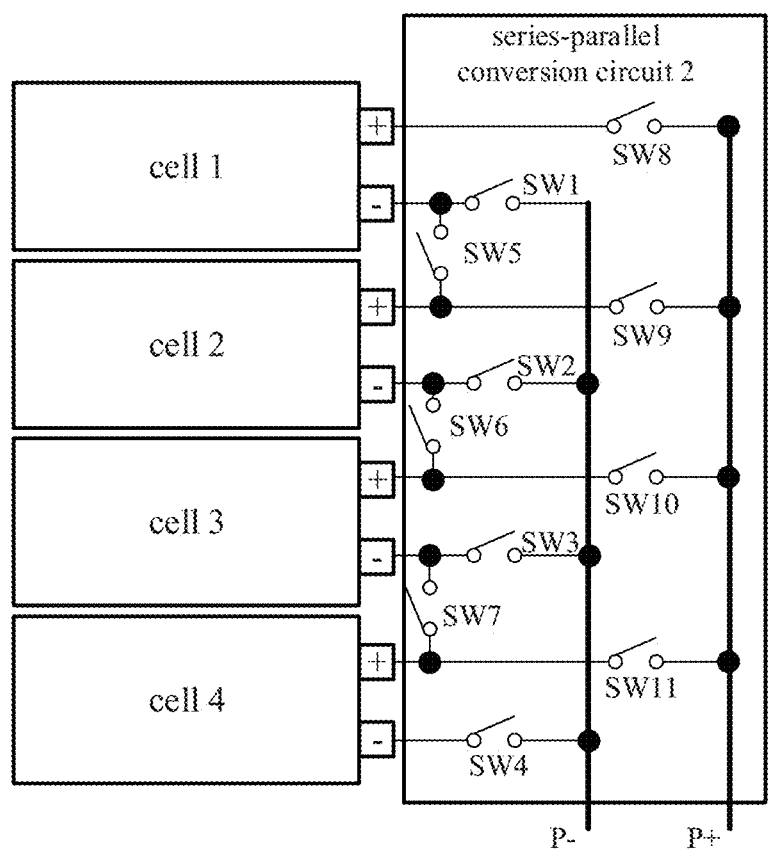
FIG. 3 is a circuit diagram of a series-parallel conversion circuit according to an exemplary embodiment.

FIG. 3 is a circuit diagram of the series-parallel conversion circuit 2 (FIG. 2) according to an exemplary embodiment. In the embodiment, the series-parallel conversion circuit 2 includes a plurality of switching devices (e.g., SW1 to SW11). Each of the plurality of switching devices is coupled to a positive electrode (indicated by "+") or a negative electrode (indicated by "−") of a cell. As illustrated in FIG. 3, a switching device SW8 is coupled to a positive electrode of a cell 1, switching devices SW5 and SW9 are coupled to a positive electrode of a cell 2, switching devices SW6 and SW10 are coupled to a positive electrode of a cell 3, switching devices SW7 and SW11 are coupled to a positive electrode of a cell 4, and switching devices SW8, SW9, SW10 and SW11 are coupled to a power input end P+. The switching device SW5 is also coupled to a negative electrode of the cell 1, the switching device SW6 is also coupled to a negative electrode of the cell 2, and SW7 is also coupled to a negative electrode of the cell 3. In this manner, when a switching device is coupled to a positive electrode of a cell, the positive electrode is coupled to a power input end of the battery module or a negative electrode of an upper-level cell based on a control signal of the controller. For example, the switching device SW5 may couple the positive electrode of the cell 2 to the negative electrode of the cell 1, and the cell SW9 may couple the positive electrode of the cell 2 to the power input end P+.

When the switching device is coupled to the negative electrode of the cell, the negative electrode is coupled to the power output end of the battery module based on the control signal of the controller. For example, the switching device SW1 may couple the negative electrode of the cell 1 to a power output end P−.

The upper-level cell may be a cell that is located between a current-level cell and the power input end P+ and is closest to the current-level cell in a series charging architecture state of the plurality of cells. Referring to FIG. 3, when the cells 1 to 4 are charged in the series charging architecture state, the cell 1 is an upper-level cell of the cell 2, the cell 2 is an upper-level cell of the cell 3, and the cell 3 is an upper-level cell of the cell 4. It should be noted that since the cell 1 is directly coupled to the power input end P+, the cell 1 does not have an upper-level cell.

In an embodiment, a number of the plurality of cells is four. With continued reference to FIG. 3, the series-parallel conversion circuit 2 may include: the switching device SW1, the switching device SW2, the switching device SW3, the switching device SW4, the switching device SW5, the switching device SW6, the switching device SW7, the switching device SW8, and the switching device SW9, the switching device SW10 and the switching device SW11. The switching device SW1 is arranged between the negative electrode of the cell 1 and the power output end P−, the switching device SW2 is arranged between the negative electrode of the cell 2 and the power output end P−, the switching device SW3 is arranged between the negative electrode of the cell 3 and the power output end P−, and the switching device SW4 is arranged between the negative electrode of the cell 4 and the power output end P−. The switching device SW8 is arranged between the positive electrode of the cell 1 and the power input end P+. The switching device SW5 is arranged between the positive electrode of the cell 2 and the negative electrode of the cell 1, the switching device SW6 is arranged between the positive electrode of the cell 3 and the negative electrode of the cell 2, and the switching device SW7 is arranged between the positive electrode of the cell 4 and the negative electrode of the cell 3. The switching device SW9 is arranged between the positive electrode of the cell 2 and the power input end P+, the switching device SW10 is arranged between the positive electrode of the cell 3 and the power input end P+, and the switching device SW11 is coupled in series between the positive electrode of the cell 4 and the power input end P+.

In an embodiment, control ends of the switching devices SW1 to SW11 are all coupled to the controller 3, so that the control signal sent by the controller 3 may be received, and an ON state or an OFF state may be realized based on the control signal.

In an embodiment, the switching devices SW1 to SW11 may be implemented by field effect transistors. In an embodiment, the switching devices SW1 to SW11 may also be implemented by a single-pole double-throw switch. In an embodiment, the switching devices SW5 and SW9 may be implemented by one single-pole double-throw switch. Similarly, SW6 and SW10 as well as SW7 and SW11 may be implemented by one single-pole double-throw switch, respectively.

In an embodiment, the series-parallel conversion circuit 2 is configured to adjust the cells 1 to 4 to one of the following charging architecture states: at least two cells coupled in series, at least two cells coupled in parallel, a combination of certain cells coupled in series and certain cells coupled in parallel, and a single cell, and states of the switching devices SW5, SW6 and SW7 are different from states of other switching devices. For example, when the switching devices SW5, SW6 and SW7 are in the ON state, positive electrodes of current-level cells will be coupled to negative electrodes of upper-level cells, and when the switching devices SW5, SW6 and SW7 are in the OFF state, the connection between the positive electrodes of the current-level cells and the negative electrodes of the upper-level cells will be disconnected. Referring to FIG. 3, taking the switching device SW5 as an example, an ON state of SW5 refers to a connection to the left end of the switching device SW1. In this manner, the positive electrode of the cell 2 is coupled to the negative electrode of the cell 1. The OFF state of the switching device SW5 refers to disconnecting a connection between the positive electrode of the cell 2 and the negative electrode of the cell 1.

The controller 3 may directly communicate with the charger. In an embodiment, the charger has different protocol types, and the battery module further includes a protocol conversion chip. The protocol conversion chip is arranged between the controller 3 and the charger and is configured for a charging protocol conversion between the controller and the charger.

In an embodiment, the controller 3 may communicate with the external charger to determine a charging parameter that the charger may provide. In an embodiment, the controller 3 may not request the charger to determine the charging parameter that it may provide, that is, the controller determines that the charger may provide any charging parameter required by the battery module by default.

In the following, the working process of the battery modules in different charging architecture states is described by taking the controller 3 communicating with the charger to determine the charging parameter and with reference to the battery module illustrated in FIGS. 2 to 6.

Figure 7:
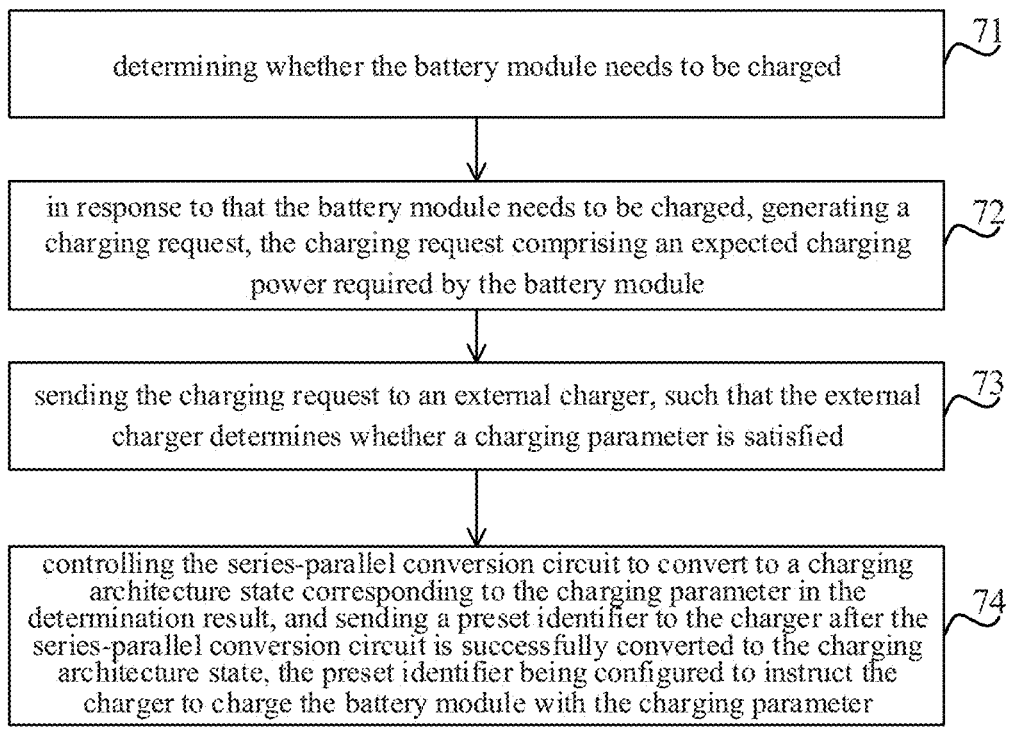
FIGS. 7-9 are flowcharts of a charging control method according to exemplary embodiments.

In charging architecture state 1, the charging voltage is four times of the cell voltage, and the four cells are charged in series. FIG. 7 is a flowchart of a charging control method relating to charging architecture state 1, according to an exemplary embodiment.

Referring to FIGS. 2 and 7, at block 71, the controller 3 obtains current charging parameters of the battery module, such as electric quantity, a relative voltage or an absolute voltage, and preset parameter thresholds of the charging parameters. Taking the charging parameter as the electric quantity as an example, the controller 3 may determine whether the battery module is to be charged based on a current electric quantity and an electric quantity threshold. For example, the electric quantity threshold may be set to several groups, such as 80%, 60%, 45%, and 30% and below. When the current electric quantity of the battery module is less than or equal to the above-mentioned electric quantity thresholds, the battery module is to be charged. When the current electric quantity of the battery module is greater than 80%, the battery module may not to be charged. In some embodiments, as long as the current electric quantity of the battery module is less than 100%, the battery module may be charged. The battery module may not to be charged when the electric quantity is equal to 100%. A person skilled in the art may make settings according to specific scenes.

In an example, the charging parameter may also be a charging level. The controller 3 determines the charging level based on the electric quantity of the battery and the voltage, as illustrated in Table 1.

TABLE 1

| | Charging level | | | |
|---|---|---|---|---|
| | 1 | 2 | 3 | 4 |
| Output voltage | 0.5-5 | 5-10 | 10-15 | 15-20 |
| Output current | 0.1-3 | 1.5-3 | 1.5-3 | 3-6 |

At block 72, the controller 3 generates a charging request when determining that the battery module is to be charged. The charging request includes charging parameters required by the battery module. The charging voltage in the charging parameters is illustrated as an example. If a voltage of the cell 1 is 4.25V, the charging voltage may be greater than 4.25. For example, if the maximum current of the charging cable is 5 A and the maximum voltage of the battery is 5V, the maximum charging power allowed by the battery module may be (4.25V*5 A*4)=85 W. The method to calculate the charging power may be referred to related technologies, and is not limited here.

At block 73, the controller 3 may send the charging request to the charger. The charger obtains the charging parameter in the charging request, and determines whether the charging parameter may be provided to obtain a determination result that the charging parameter may be or may not be provided. The charger feeds back the determination result to the controller 3. When the determination result indicates that the charging parameter may not be provided, the charger may also feed back a charging parameter that may be provided. For example, the charger may not provide a charging power of 85 W, but may provide a charging power of 50 W.

Figure 4:
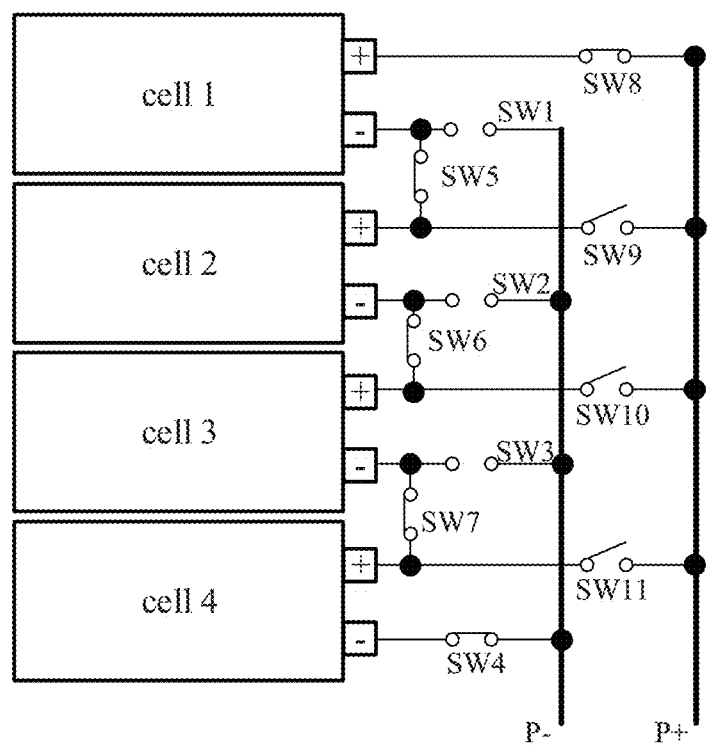
FIGS. 4-6 are circuit diagrams of a charging architecture of a series-parallel conversion circuit according to exemplary embodiments.

At block 74, the controller 3 may control the series-parallel conversion circuit 2 to convert to a charging architecture state corresponding to the charging parameter, and send a preset identifier to the charger after the series-parallel conversion circuit 2 is successfully converted to the charging architecture state. The preset identifier is configured to instruct the charger to charge the battery module with the charging parameter. Take the above charging power being provided by the charger as an example. The controller 3 sends a control signal to the series-parallel conversion circuit 2 after receiving the determination result, and each switching device in the series-parallel conversion circuit 2 switches to the ON state or OFF state based on the control signal, so that the cells 1 to 4 are charged in series, and the circuit as illustrated in FIG. 4 is obtained. Assuming that the charging voltage of each cell is 4.5V, the output voltage of the charger is 4*4.5V=18V, and the charging power is 85 W. And then, the charger charges the battery module based on the charging power of 85 W.

In charging architecture state 2, the charging voltage is twice the cell voltage. In this case, every two cells in the four cells are coupled in series and then charged in parallel. In other words, the charger may only provide a charging voltage that is twice the cell voltage.

The controller 3 obtains the current charging parameter of the battery module and determines whether the battery module is to be charged. The controller 3 generates the charging request when determining that the battery module is to be charged. The charging request includes the charging parameter required by the battery module.

The controller 3 may send the charging request to the charger. The charger obtains the charging parameter in the charging request, and determines whether the above charging parameter may be satisfied to obtain a determination result that the above charging parameter may be or may not be satisfied. The charger feeds back the determination result to the controller 3.

Figure 5:
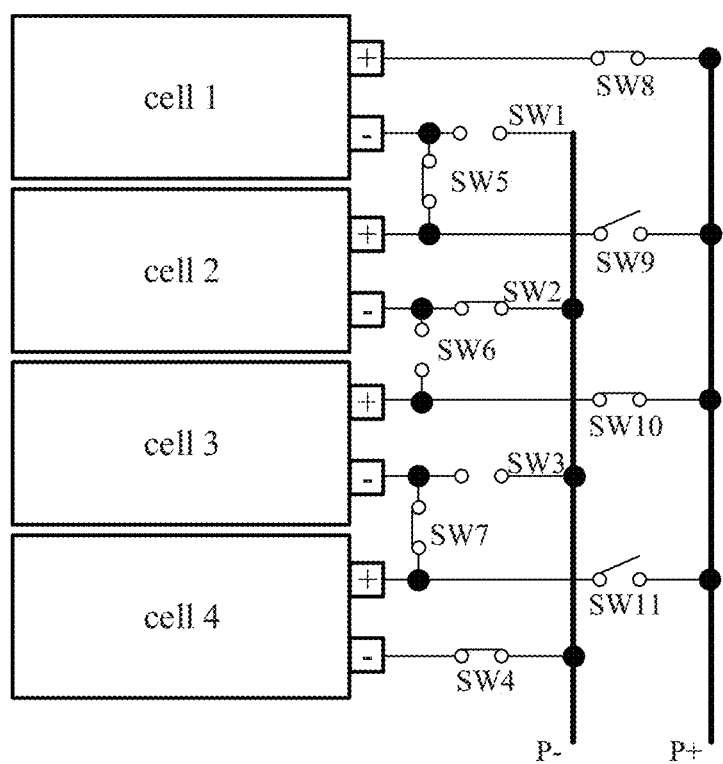

When the charger determines that the charging parameter may not be satisfied, a charging parameter that the charger may satisfy may be fed back to the controller 3. The controller 3 may send the control signal to the series-parallel conversion circuit 2 based on the charging parameter that may be satisfied. Each switching device in the series-parallel conversion circuit 2 is switched to the ON state or OFF state based on the control signal, so that the cells 1 to 4 are coupled in series two by two and then charged in parallel to obtain the circuit as illustrated in FIG. 5. Assuming that the charging voltage of each cell is 4.5V, the output voltage of the charger is 2*4.5V=9V, and the charging power is 5*9=45 W. Finally, the charger charges the battery module based on the charging power of 45 W.

In charging architecture state 3, the charging voltage is equal to the cell voltage, and the four cells are charged in parallel. In other words, the charger may only provide a charging voltage that is the same as the cell voltage.

The controller 3 obtains the current charging parameter of the battery module and determines whether the battery module is to be charged. The controller 3 generates the charging request when determining that the battery module is to be charged. The charging request includes the charging parameter required by the battery module.

The controller 3 may send the charging request to the charger. The charger obtains the charging parameter in the charging request, and determines whether the charging parameter may be satisfied to obtain a determination result that the above charging parameter may be or may not be satisfied. The charger feeds back the determination result to the controller 3.

Figure 6:
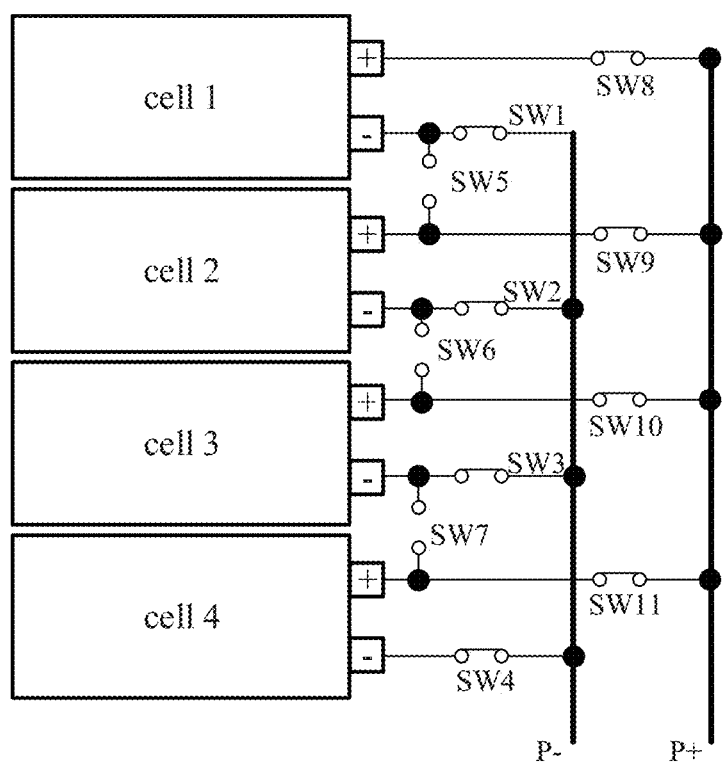

When the charger determines that the charging parameter may not be satisfied, a charging parameter that the charger may satisfy may be fed back to the controller 3. The controller 3 sends the control signal to the series-parallel conversion circuit 2, based on the charging parameter that may be satisfied. Each switching device in the series-parallel conversion circuit 2 is switched to the ON state or OFF state based on the control signal, so that the cells 1 to 4 are charged in parallel to obtain the circuit as illustrated in FIG. 6. Assuming that the charging voltage of each cell is 4.5V, the output voltage of the charger is 4.5V, and the charging power is 22.5 W. Finally, the charger charges the battery module based on the charging power of 22.5 W.

The above embodiments provide three typical charging architecture states. In some embodiments, the controller 3 may also control any set of the cells 1 and 2, the cells 2 and 3, the cells 3 and 4, and any one of cells 1 to 4 for charging. The charging voltage is no longer limited to four times, two times and one time of the cell voltage. The combinations also fall into the scope of the present disclosure.

Figure 8:
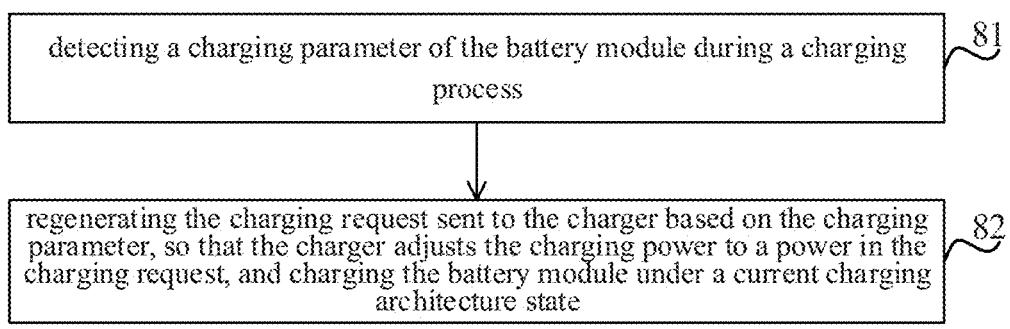

In an embodiment, in each of the above charging architecture states, after the communication between the controller 3 and the charger is completed, the charger charges the battery module. FIG. 8 is a flowchart of a charging control according to an exemplary embodiment. Referring to FIG. 8, at block 81, during the charging process, the controller 3 may detect the charging parameter of the battery module in real time. At block 82, the controller 3 regenerates the charging request sent to the charger based on the charging parameter, so that the charger adjusts the charging power in the current charging architecture state. For example, when the voltage of each cell in the battery module reaches 4.6V, constant voltage (CV) charging may be adopted. In this manner, the charging current is adjusted to reduce the charging power until the charging is completed.

Figure 9:
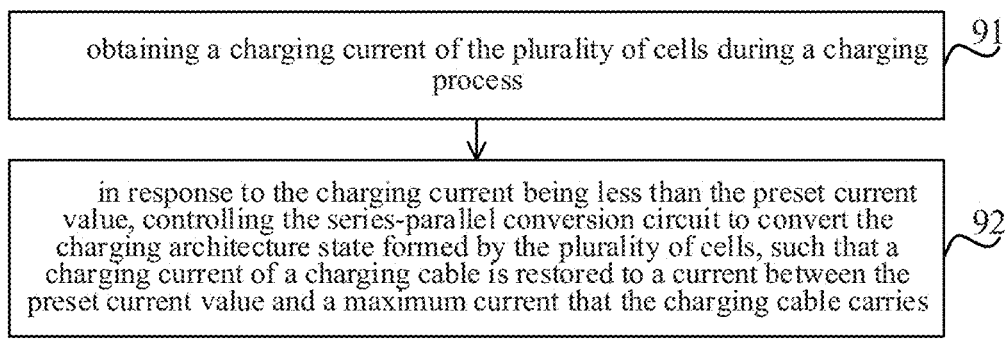

In some embodiments, when a manner of performing charging with the plurality of cells coupled in series is used all the time, one cell may be damaged, resulting in high voltage but not charged, that is, some cells are over-voltage and other cells are under-voltage. In this case, it takes a long time to charge the battery module, which reduces the charging efficiency of the battery module. In order to ensure the charging efficiency, in an embodiment, the controller 3 may also adjust the charging architecture state of the plurality of cells. FIG. 9 is a flowchart of a charging control according to an exemplary embodiment. Referring to FIG. 9, at block 91, the controller 3 may obtain a charging current of the plurality of cells. For example, the controller 3 may communicate with a voltammeter in the battery module to obtain the charging current. At block 92, the controller 3 compares the charging current with a preset current value (for example, 2.5 A). When the charging current is less than the preset current value, the controller 3 may couple two (or more) cells in series, and then a plurality of series branches are coupled in parallel, thereby obtaining a series-parallel charging architecture. In this manner, when the charging current does not exceed the maximum current of the charging cable, the voltage of the cells is balanced by parallel charging, so that the plurality of cells may be in the same state of use, trying to achieve an effect of synchronous charging, and improving the charging efficiency.

Figure 10:
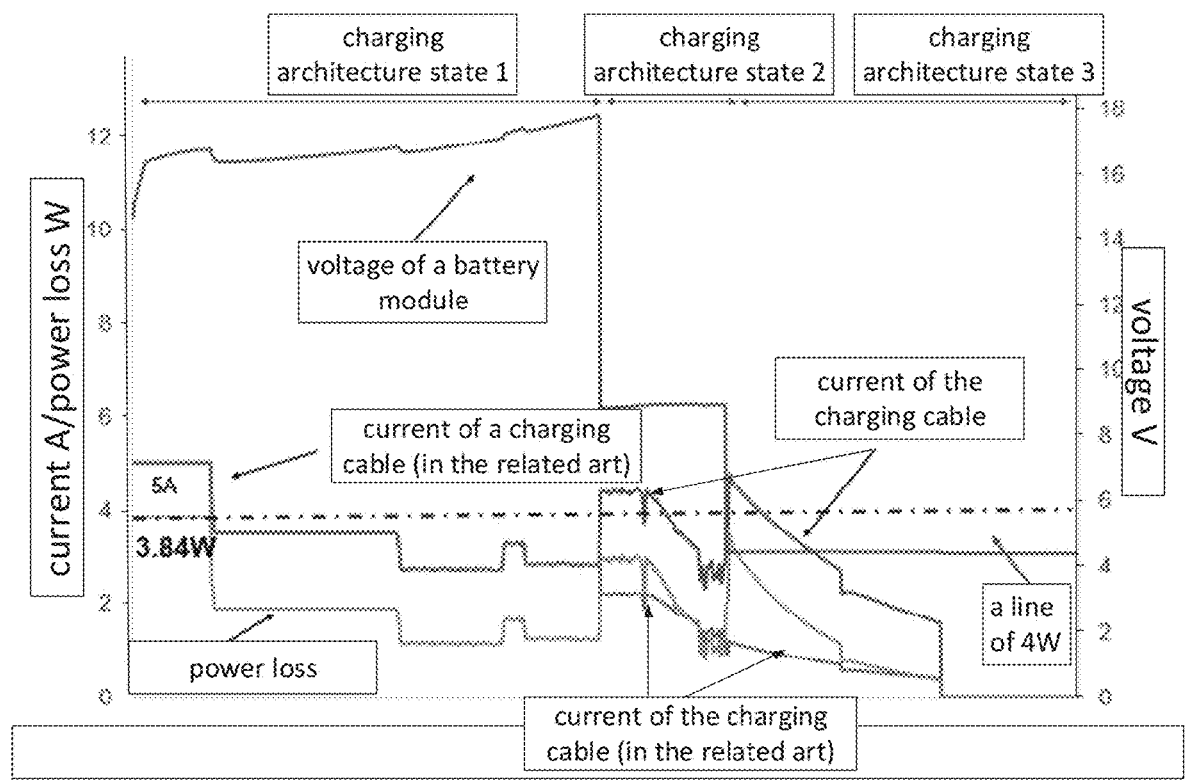
FIG. 10 is a schematic diagram of a charging curve according to an exemplary embodiment.

With continued reference to FIG. 3, when the cells are charged in the charging architecture state 1, if the charging current drops to 2.5 A (or below), the current of the charging cable is also 2.5 A. In order to ensure that the charging current of the battery module is restored to a value between 2.5 A and 5 A, even if the current of the charging cable is as close as possible to 5 A, the controller 3 may couple two cells in series to form one series branch, so that two series branches may be coupled in parallel to realize a current of 5 A of the charging cable. The controller 3 may switch the charging architecture state 1 to the charging architecture state 2. In the charging architecture state 2, as the cell voltage increases, the charging current will continue to decrease. When the current of the charging cable drops to 2.5 A (or below) again, the controller 3 may change the charging architecture state 2 to the charging architecture state 3. Based on the above charging process, the charging curve illustrated in FIG. 10 may be obtained. Compare the current of the charging cable in the related art with the current of the charging cable according to the embodiment, for the charging architecture state 2 and charging architecture state 3, the current of the charging cable according to the embodiment is between 2.5 A and 5 A, while the current of the charging cable in the related art continues to decrease. In this manner, the charging voltage of each cell is balanced while the balance of the charging power of each cell is maintained, so that the charging efficiency is increased.

According to embodiments of the present disclosure, the charging architecture state of the plurality of cells is adjusted, such that the charging current is greater than the preset current value and less than the maximum current of the charging cable. That is, the battery module may be charged with a high voltage and a large current without a voltage conversion device, helping to increase the charging efficiency of the battery module. In addition, the series-parallel conversion circuit according to embodiments of the present disclosure does not participate in voltage conversion and does not cause heat loss, which is beneficial to improving the charging efficiency of the battery module.

Embodiments of the present disclosure provide a charging control method, which is applicable to a battery module including a plurality of cells, a series-parallel conversion circuit, and a controller. The method includes: determining whether the battery module is to be charged; and in response to that the battery module is to be charged, controlling the series-parallel conversion circuit to convert a connection mode of cells in the plurality of cells, such that the plurality of cells form a charging architecture state with a charging current greater than a preset current value. The charging architecture state includes at least one of: at least two cells coupled in series, at least two cells coupled in parallel, a combination of certain cells coupled in series and certain cells coupled in parallel, or a single cell.

In an embodiment, before controlling the series-parallel conversion circuit to convert the connection mode of the cells in the plurality of cells, the method includes: in response to that the battery module is to be charged, generating a charging request, wherein the charging request includes a charging power required by the battery module; sending the charging request to an external charger, such that the external charger determines whether it can satisfy the required charging power and returns a determination result, wherein the determination result includes a target charging power that the external charger may provide, and the target charging power is less than or equal to the required charging power; and after the determination result is received, controlling the series-parallel conversion circuit to convert the connection mode of cells in the plurality of cells, such that the plurality of cells form a charging architecture state matching the target charging power, and an initial charging current in the charging architecture state being a maximum current that a charging cable can carry.

In an embodiment, generating the charging request includes: obtaining a current voltage of the plurality of cells and the maximum current that the charging cable can carry; obtaining the charging power required by the battery module based on the current voltage and the maximum current; and generating the charging request based on the required charging power.

In an embodiment, the method includes sending a preset identifier to an external charger after the plurality of cells are converted into the charging architecture state. The preset identifier is configured to instruct the external charger to charge the battery module at a target charging power.

In an embodiment, the method includes: obtaining a charging current of the plurality of cells during a charging process; and in response to the charging current being less than the preset current value, controlling the series-parallel conversion circuit to convert the charging architecture state formed by the plurality of cells, such that a charging current of a charging cable is restored to a current between the preset current value and a maximum current that the charging cable can carry.

Figure 11:
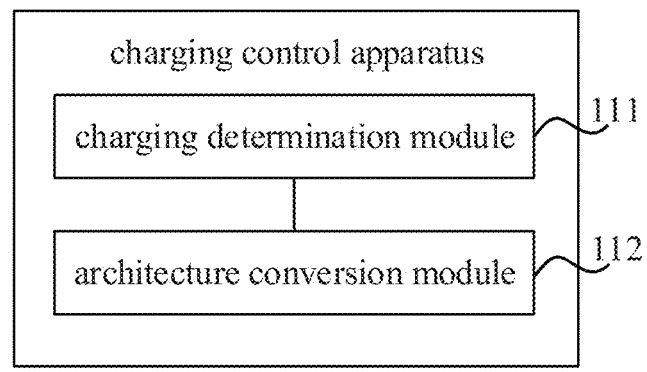
FIGS. 11-14 are block diagrams of a charging control apparatus according to exemplary embodiments.

FIG. 11 is a block diagram of a charging control apparatus according to an exemplary embodiment. The charging control apparatus is applicable to a battery module including a plurality of cells, a series-parallel conversion circuit, and a controller. The apparatus includes a charging determination module 111 and an architecture conversion module 112.

The charging determination module 111 is configured to determine whether the battery module is to be charged.

The architecture conversion module 112 is configured to, in response to that the battery module is to be charged, control the series-parallel conversion circuit to convert a connection mode of cells in the plurality of cells, such that the plurality of cells form a charging architecture state with a charging current greater than a preset current value. The charging architecture state includes at least one of: at least two cells coupled in series, at least two cells coupled in parallel, a combination of certain cells coupled in series and certain cells coupled in parallel, or a single cell.

Figure 12:
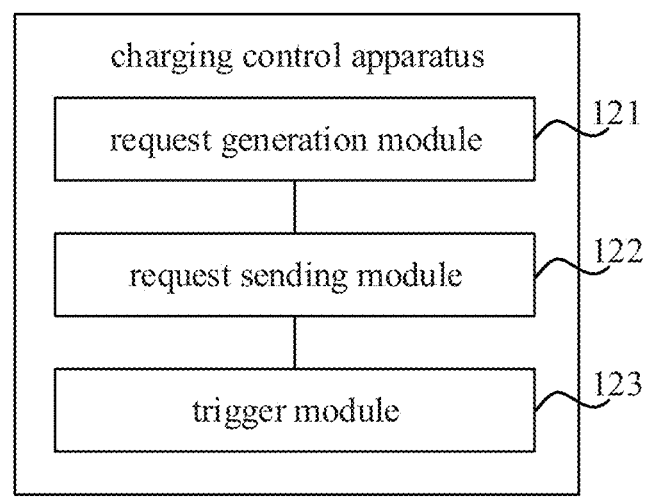

In an embodiment, as illustrated in FIG. 12, the charging control apparatus includes a request generation module 121, a request sending module 122, and a trigger module 123.

The request generation module 121 is configured to, in response to that the battery module is to be charged, generate a charging request. The charging request includes a charging power required by the battery module.

The request sending module 122 is configured to send the charging request to an external charger, such that the external charger determines whether it can satisfy the required charging power and returns a determination result. The determination result includes a target charging power that the external charger may provide, and the target charging power is less than or equal to the required charging power.

The trigger module 123 is configured to, after the determination result is received, trigger the architecture conversion module to convert a charging architecture, such that the plurality of cells form a charging architecture state matching the target charging power. An initial charging current in the charging architecture state is a maximum current that a charging cable can carry.

Figure 13:
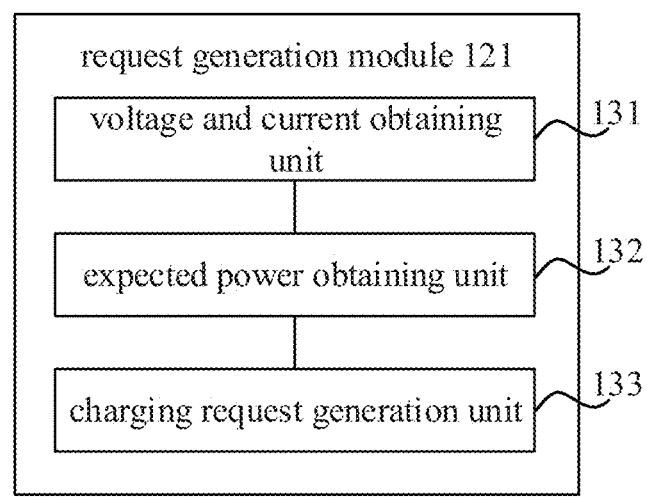

In an embodiment, as illustrated in FIG. 13, the request generation module 121 (FIG. 12) includes a voltage and current obtaining unit 131, an expected power obtaining unit 132, and a charging request generation unit 133.

The voltage and current obtaining unit 131 is configured to obtain a current voltage of the plurality of cells and the maximum current that the charging cable can carry.

The expected power obtaining unit 132 is configured to obtain the charging power required by the battery module based on the current voltage and the maximum current.

The charging request generation unit 133 is configured to generate the charging request based on the required charging power.

In an embodiment, the charging control apparatus includes a preset identifier sending module. The preset identifier sending module is configured to send a preset identifier to an external charger after the plurality of cells are converted into the charging architecture state. The preset identifier is configured to instruct the external charger to charge the battery module at a target charging power.

Figure 14:
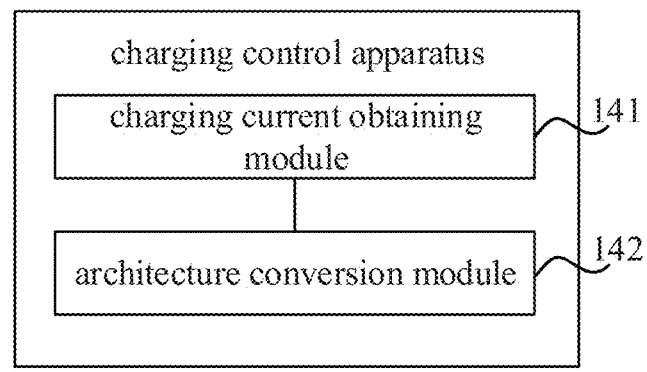

In an embodiment, as illustrated in FIG. 14, the charging control apparatus includes a charging current obtaining module 141 and an architecture conversion module 142.

The charging current obtaining module 141 is configured to obtain a charging current of the plurality of cells during a charging process.

The architecture conversion module 142 is configured to, in response to the charging current being less than the preset current value, control the series-parallel conversion circuit to convert the charging architecture state formed by the plurality of cells, such that a charging current of a charging cable is restored to a current between the preset current value and a maximum current that the charging cable can carry.

Figure 15:
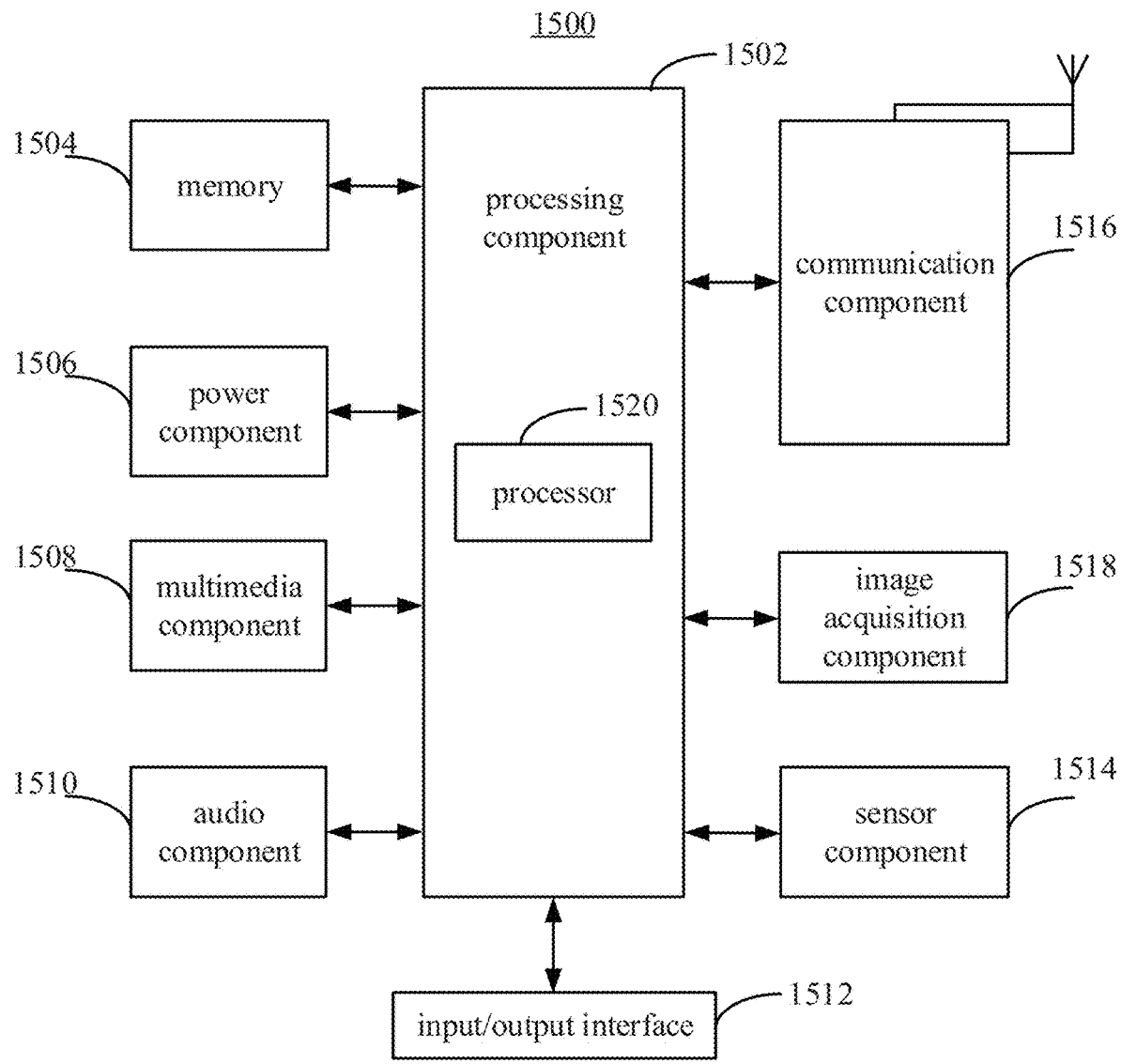
FIG. 15 is a block diagram of an electronic device according to an exemplary embodiment.

FIG. 15 is a block diagram of an electronic device 1500 according to an exemplary embodiment. For example, the electronic device 1500 may be a smartphone, a computer, a digital broadcast terminal, a tablet device, a medical device, an exercise device, a personal digital assistant, and so on.

Referring to FIG. 15, the electronic device 1500 may include one or more of the following components: a processing component 1502, a memory 1504, a power component 1506, a multimedia component 1508, an audio component 1510, an input/output (I/O) interface 1512, a sensor component 1514, a communication component 1516, and an image acquisition component 1518.

The processing component 1502 normally controls the overall operation (such as operations associated with displaying, telephone calls, data communications, camera operations and recording operations) of the electronic device 1500. The processing component 1502 may include one or more processors 1520 to execute instructions so as to perform all or part of the steps of the above described methods. In addition, the processing component 1502 may include one or more units to facilitate interactions between the processing component 1502 and other components. For example, the processing component 1502 may include a multimedia unit to facilitate interactions between the multimedia component 1508 and the processing component 1502.

The memory 1504 is configured to store various types of data to support operations at the electronic device 1500. Examples of such data include computer programs for any application or method operated on the electronic device 1500, contact data, phone book data, messages, images, videos and the like. The memory 1504 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1506 provides power to various components of the electronic device 1500. The power component 1506 may include a power management system, one or a plurality of power sources and other components associated with power generation, management, and distribution of the electronic device 1500. The power component 1506 may include a power chip. The controller may communicate with the power chip to control the power chip to turn on or off the switching device, so that the battery supplies power or does not supply power to a main board circuit. In an example, the power component 1506 includes the battery module illustrated in FIGS. 2-6.

The multimedia component 1508 includes a screen that provides an output interface between the electronic device 1500 and a target object. In some embodiments, the screen may include a liquid crystal display (LCD) and a touch panel (TP). If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations.

The audio component 1510 is configured to output and/or input an audio signal. For example, the audio component 1510 includes a microphone (MIC) that is configured to receive an external audio signal when the electronic device 1500 is in an operation mode such as a call mode, a recording mode, and a voice recognition mode. The received audio signal may be further stored in the memory 1504 or transmitted via the communication component 1516. In some embodiments, the audio component 1510 further includes a speaker for outputting audio signals.

The I/O interface 1512 provides an interface between the processing component 1502 and a peripheral interface unit. The peripheral interface unit may be a keyboard, a click wheel, a button and so on.

The sensor assembly 1514 includes one or more sensors for providing the electronic device 1500 with various aspects of status assessments. For example, the sensor component 1514 may detect an ON/OFF state of the electronic device 1500 and a relative positioning of the components. For example, the components may be a display and a keypad of the electronic device 1500. The sensor component 1514 may also detect a change in position of the electronic device 1500 or a component of the electronic device 1500, the presence or absence of contact of the target object with the electronic device 1500, the orientation or acceleration/deceleration of the electronic device 1500 and a temperature change of the electronic device 1500.

The communication component 1516 is configured to facilitate wired or wireless communication between the electronic device 1500 and other devices. The electronic device 1500 may access a wireless network based on a communication standard such as WiFi, 4G or 5G, or a combination thereof. In an exemplary embodiment, the communication component 1516 receives broadcast signals or broadcast-associated information from an external broadcast management system via a broadcast channel. In an exemplary embodiment, the communication component 1516 further includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the electronic device 1500 may be implemented by one or a plurality of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components.

In an exemplary embodiment, there is also provided a non-transitory readable storage medium including executable computer programs, such as a memory 1504 including instructions. The executable computer programs are executable by the processor. For example, the readable storage medium may be a ROM, a random access memory (RAM), a CD-ROM, a magnetic tape, a floppy disk, an optical data storage device, etc.

Other embodiments of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and embodiments are exemplary only, and the real scope and spirit of the present disclosure are indicated in the appended claims.

It should be understood that the present disclosure is not limited to the precise structures described above and illustrated in the drawings, and various modifications and changes may be made without departing from the scope thereof. The scope of the present disclosure is merely limited by the appended claims.

What is claimed is:

1. A battery module, comprising:
a plurality of cells;
a series-parallel conversion circuit; and
a controller,
wherein the controller is coupled to the series-parallel conversion circuit and is configured to control the series-parallel conversion circuit to convert a connection mode of cells in the plurality of cells when the battery module is to be charged, such that the plurality of cells form a charging architecture state with a charging current greater than a preset current value, the charging architecture state comprising at least one of: at least two cells coupled in series, at least two cells coupled in parallel, a combination of first cells coupled in series and second cells coupled in parallel, or a single cell;
wherein the controller is configured to obtain a charging current of the plurality of cells during a charging process, and in response to the charging current being less than the preset current value, to control the series-parallel conversion circuit to convert the charging architecture state formed by the plurality of cells, such that a charging current of a charging cable is restored to a current between the preset current value and a maximum current that the charging cable can carry.

2. The battery module of claim 1, wherein the controller is integrated into the battery module, or the controller is implemented by a processor of an electronic device provided with the battery module, or the controller is implemented by a power management module of the electronic device.

3. The battery module of claim 1, wherein the series-parallel conversion circuit comprises a plurality of switching devices, and each switching device in the plurality of switching devices is coupled to one of a positive electrode or a negative electrode of one cell; wherein:
when the switching device is coupled to the positive electrode of one cell, the switching device is configured to couple the positive electrode to a power input end of the battery module or a negative electrode of an upper-level cell based on a control signal of the controller; and
when the switching device is coupled to the negative electrode of one cell, the switching device is configured to couple the negative electrode to a power output end of the battery module based on the control signal of the controller.

4. The battery module of claim 1, further comprising: a protocol conversion chip coupled to the controller and configured for a charging protocol conversion between the controller and an external charger.

5. A charging control method for a battery module including a plurality of cells, the method comprising:
determining whether the battery module is to be charged; and
in response to that the battery module is to be charged, converting a connection mode of cells in the plurality of cells, such that the plurality of cells form a charging architecture state with a charging current greater than a preset current value, the charging architecture state comprising at least one of: at least two cells coupled in series, at least two cells coupled in parallel, a combination of first cells coupled in series and second cells coupled in parallel, or a single cell;
wherein the method further comprises:
obtaining a charging current of the plurality of cells during a charging process; and
in response to the charging current being less than the preset current value, converting the charging architecture state formed by the plurality of cells, such that a charging current of a charging cable is restored to a current between the preset current value and a maximum current that the charging cable can carry.

6. The method of claim 5, before converting the connection mode of the cells in the plurality of cells, further comprising:
determining a charging parameter provided by an external charger; and
converting the connection mode of the cells in the plurality of cells, such that the plurality of cells form a charging architecture state matching the charging parameter provided by the external charger.

7. The method of claim 5, before converting the connection mode of the cells in the plurality of cells, further comprising:
in response to that the battery module is to be charged, generating a charging request, wherein the charging request comprises a charging power required by the battery module;
sending the charging request to an external charger, such that the external charger determines whether the external charger can satisfy the required charging power and returns a determination result, wherein the determination result comprises a target charging power that the external charger provides, and the target charging power is less than or equal to the required charging power; and
after the determination result is received, converting the connection mode of the cells in the plurality of cells, such that the plurality of cells form a charging architecture state matching the target charging power, and an initial charging current in the charging architecture state being the maximum current that the charging cable can carry.

8. The method of claim 7, wherein generating the charging request comprises:
obtaining a current voltage of the plurality of cells and the maximum current that the charging cable can carry;
obtaining the charging power required by the battery module based on the current voltage and the maximum current; and
generating the charging request based on the obtained charging power.

9. The method of claim 5, further comprising:
sending a preset identifier to an external charger after the plurality of cells are converted into the charging architecture state, wherein the preset identifier is configured to instruct the external charger to charge the battery module at a target charging power.

10. The method of claim 5, wherein determining whether the battery module is to be charged comprises:
obtaining at least one current charging parameter of the battery module and at least one preset parameter threshold of the at least one current charging parameter; and
determining whether the battery module is to be charged, based on the at least one preset parameter threshold and the at least one current charging parameter.

11. A non-transitory computer-readable storage medium having stored thereon instructions that, when executed by a processor of a device, cause the device to perform a charging control method on a battery module comprising a plurality of cells, wherein the method comprises:
determining whether the battery module is to be charged; and in response to that the battery module is to be charged, converting a connection mode of cells in the plurality of cells, such that the plurality of cells form a charging architecture state with a charging current greater than a preset current value, the charging architecture state comprising at least one of: at least two cells coupled in series, at least two cells coupled in parallel, a combination of first cells coupled in series and second cells coupled in parallel, or a single cell;

wherein the method further comprises:

obtaining a charging current of the plurality of cells during a charging process; and in response to the charging current being less than the preset current value, converting the charging architecture state formed by the plurality of cells, such that a charging current of a charging cable is restored to a current between the preset current value and a maximum current that the charging cable can carry.

12. The storage medium of claim 11, wherein before converting the connection mode of the cells in the plurality of cells, the method further comprises:

determining a charging parameter provided by an external charger; and converting the connection mode of the cells in the plurality of cells, such that the plurality of cells form a charging architecture state matching the charging parameter provided by the external charger.

13. The storage medium of claim 11, wherein before converting the connection mode of the cells in the plurality of cells, the method further comprises:

in response to that the battery module is to be charged, generating a charging request, wherein the charging request comprises a charging power required by the battery module;

sending the charging request to an external charger, such that the external charger determines whether the external charger can satisfy the required charging power and returns a determination result, wherein the determination result comprises a target charging power that the external charger provides, and the target charging power is less than or equal to the required charging power; and after the determination result is received, converting the connection mode of the cells in the plurality of cells, such that the plurality of cells form a charging architecture state matching the target charging power, and an initial charging current in the charging architecture state being the maximum current that the charging cable can carry.

14. The storage medium of claim 13, wherein generating the charging request comprises:

obtaining a current voltage of the plurality of cells and the maximum current that the charging cable can carry;

obtaining the charging power required by the battery module based on the current voltage and the maximum current; and generating the charging request based on the obtained charging power.

15. The storage medium of claim 11, wherein the method further comprises:

sending a preset identifier to an external charger after the plurality of cells are converted into the charging architecture state, wherein the preset identifier is configured to instruct the external charger to charge the battery module at a target charging power.

16. The storage medium of claim 11, wherein determining whether the battery module is to be charged comprises:

obtaining at least one current charging parameter of the battery module and at least one preset parameter threshold of the at least one current charging parameter; and determining whether the battery module is to be charged, based on the at least one preset parameter threshold and the at least one current charging parameter.

* * * * *